(12) United States Patent
Wei et al.

(10) Patent No.: US 7,913,016 B2
(45) Date of Patent: *Mar. 22, 2011

(54) METHOD OF DETERMINING REQUEST TRANSMISSION PRIORITY SUBJECT TO REQUEST SOURCE AND TRANSMITTING REQUEST SUBJECT TO SUCH REQUEST TRANSMISSION PRIORITY IN APPLICATION OF FIELDBUS COMMUNICATION FRAMEWORK

(75) Inventors: Bo-Er Wei, Taipei (TW); You-Shih Chen, Shing Tien (TW)

(73) Assignee: Moxa, Inc., Shing Tien (TW)

( * ) Notice: Subject to any disclaimer, the term of this patent is extended or adjusted under 35 U.S.C. 154(b) by 269 days.

This patent is subject to a terminal disclaimer.

(21) Appl. No.: 11/687,666

(22) Filed: Mar. 18, 2007

(65) Prior Publication Data

US 2008/0228976 A1    Sep. 18, 2008

(51) Int. Cl.
*G06F 12/00* (2006.01)
*G06F 13/26* (2006.01)
*G06F 15/173* (2006.01)

(52) U.S. Cl. ........ 710/244; 710/111; 710/113; 710/119; 710/263; 710/264; 710/310; 711/150; 709/225

(58) Field of Classification Search .............. 710/244, 710/264
See application file for complete search history.

(56) References Cited

U.S. PATENT DOCUMENTS

| | | | | |
|---|---|---|---|---|
| 6,111,888 A * | 8/2000 | Green et al. | ............... | 370/461 |
| 6,154,800 A * | 11/2000 | Anand | ............... | 710/107 |
| 6,629,247 B1 * | 9/2003 | Hall et al. | ............... | 713/300 |
| 6,813,767 B1 * | 11/2004 | Willke | ............... | 718/101 |
| 2007/0204081 A1 * | 8/2007 | Herz | ............... | 710/110 |
| 2008/0043766 A1 * | 2/2008 | Bryngelson et al. | ............... | 370/412 |
| 2008/0228978 A1 * | 9/2008 | Wei et al. | ............... | 710/244 |
| 2008/0229084 A1 * | 9/2008 | Wei et al. | ............... | 712/244 |

OTHER PUBLICATIONS

CAN Specification Version 2.0, Part A; Date Unkown, 31 pages.*
SAMSON—Technical Information "FOUNDATION Fieldbus"—Date Unknown, 44 pages.*
Franco, L.R.H.R, "Transmission Scheduling for Fieldbus: a Strategy to Schedule Data and Messages on the Bus with End-to-End Constraints," Nov. 5, 1996, IEEE Internaional Joint Symposia on Intelligence and Systems, pp. 148-155.*
CAN Specification Version 2.0, Part B; Date Unknown, 38 pages.*

* cited by examiner

*Primary Examiner* — Brian T Misiura
(74) *Attorney, Agent, or Firm* — Bacon & Thomas, PLLC

(57) ABSTRACT

A method of determining request transmission priority subject to request source and transmitting request subject to such request transmission priority in application of Fieldbus communication framework in which the communication device determines whether the received requests have the priority subject to the respective source and also determines whether there is any logical operation condition established, and then the communication device transmits the received external requests to the connected slave device as an ordinary request or priority request, preventing the slave device from receiving an important external request sent by the main control end or manager at a late time.

10 Claims, 3 Drawing Sheets

METHOD OF DETERMINING REQUEST TRANSMISSION PRIORITY SUBJECT TO REQUEST SOURCE AND TRANSMITTING REQUEST SUBJECT TO SUCH REQUEST TRANSMISSION PRIORITY IN APPLICATION OF FIELDBUS COMMUNICATION FRAMEWORK

BACKGROUND OF THE INVENTION

1. Field of the Invention

The present invention relates to request transmission methods and more particularly, to a method of determining request transmission priority subject to request source and transmitting request subject to such request transmission priority in application of Fieldbus communication framework, whether the external requests came from the source that has the priority right, and then transmits every request subject to the priority order, preventing the slave device from receiving an external request from the master device at a late time.

2. Description of the Related Art

Following fast development of communication technology, communication networks have also been well developed. LAN (Local Area Network) and WAN (Wide Area Network) are the original categories of networks categorized subject to their scope and scale. A LAN connects network devices over a relatively short distance. A WAN is a geographically-dispersed collection of LANs. The Internet is the largest WAN, spanning the Earth.

Either in LAN or WAN, Ethernet has proven itself as a relatively inexpensive, reasonably fast, and very popular LAN technology. Ethernet cables (fiber optics or twisted pair) are limited in their reach, and these distances are insufficient to cover medium-sized and large network installations. Therefore, repeaters are used in Ethernets. A repeater in Ethernet networking is a device that allows multiple cables to be joined and greater distances to be spanned. A bridge device can join an Ethernet to another network of a different type, such as a wireless network. Popular types of repeater devices are Ethernet hubs, switches and routers. By means of the combination of Ethernet cables with hubs, switches and/or routers, an Ethernet networking allows transmission or control of data or instructions among different LANs, computers, and/or other devices such as surveillance systems, security systems, automation systems, etc.

Further, there is known a network communication architecture commonly seen in industrial control and device communication protocol or rules, i.e., Fieldbus".

Fieldbus is usually used on the industrial network system for real-time distributed control. Its basic configuration is to handle management through a central control unit so that an operator can monitor or program the whole system. The central control unit is typically linked to a middle layer of programmable logic controllers (PLCs) via a bus system. At the bottom of the control chain is the fieldbus which links the PLCs to the components which actually do the work such as sensors, electric motors, switches and contactors.

Following alternation of generations, there are now a wide variety of concurring fieldbus standards. Some of the most widely used ones include CAN, EtherCAT, DeviceNet, Modbus, PROFIBUS, SECS and CompuBus.

Further, Fieldbus is a new industrial digital communications network intended to replace the existing 4-20 mA analogue signal standard. The network is a digital, bi-directional, multidrop, serial-bus, communications network used to link isolated field devices, such as controllers, transducers, actuators and sensors. Each field device has low cost computing power installed in it, making each device a "smart" device. Each device will be able to execute simple functions on its own such as diagnostic, control, and maintenance functions as well as providing bi-directional communication capabilities. With these devices not only will the engineer be able to access the field devices, but they are also able to communicate with other field devices for master/slave communication. The major advantage of the Fieldbus that is most attractive to the end user is its reduction in capital costs. The savings attained by the user stem from three main areas, initial savings, maintenance savings, and savings due to improved systems performance. One of the main features of the Fieldbus is its significant reduction in wiring. Only one wire is sufficient to build a Fieldbus system with varying number of devices. The cost of installing field equipment in a Fieldbus system is thus significantly reduced. Installation costs are further reduced due to the fact that the Fieldbus it is a multi-drop rather than point-to-point system and the multidrop network can offer a great reduction in field wiring expense. The fact that the Fieldbus system is less complex than conventional bus systems implies that there will be less overall need for maintenance.

FIG. 3 is a schematic drawing illustrating multiple requests receiving status of a communication gate according to the prior art. Under the Fieldbus architecture, when the master device or communication gateway A received multiple requests, it transmits the requests to the slave device B subject to the order of FIFO (first in first out), i.e., the master device or communication gateway A handles the received requests subject to the order of their received times, but is unable to arrange or transmit the received requests subject to order of their importance level.

Because the master device or communication gateway A handles received requests subject to the order of FIFO (first in first out), it may be unable to transmit a request to the slave device B in time. When communication traffic is low, a communication gateway can always handle all received requests in time. However, when traffic gets higher, the gateway needs much more time to handle received requests in received time order. If there is an important request arrived at this time, the gateway may unable to transmit it to the slave in time since there are too many un-handled requests received before. This could result in many problems. For example, in a regular industrial manufacturing line (such as wafer plant, plastic materials plant), when a request to alter the set values of a slave device B (for example, the revolving speed of a motor) is given to the communication gateway A, an abnormal or interruption of the manufacturing line may occur if the slave device B cannot receive the accurate request in time to execute the request on accurate time, thereby resulting in paralysis or damage of the machinery of the industrial manufacturing line. Further, in a building control, the temperature control, emergency exit system and other control actions need to make an accurate response at the accurate time point. If responding tactics cannot be started at the accurate time point, it will get no help in reducing the probability of occurrence of disaster and the loss resulted from the disaster.

Therefore, it is desirable to provide a method of handling requests according to priority of importance.

SUMMARY OF THE INVENTION

The present invention has been accomplished under the circumstances in view. It is therefore the main object of the present invention to provide a method of determining request transmission priority subject to request source and transmitting request subject to such request transmission priority in application of Fieldbus communication framework, which determines, by means of a communication device, whether the source of every received external request has the priority right, and then lets the communication gateway/master device transmit the received requests subject to their priority condition. Therefore, the main control end or manager can send the request to the triggering system or device of an emergency facility, for example, the auto-control system of a building, on time. Because the triggering of a triggering system or device must be executed on time when necessary, the main control end or manager must send the request to the triggering system or device on time. Sending a triggering request in priority prevents the triggering system or device of the emergency facility from receiving the request at a late time. Therefore, the application of the present invention helps lower the chance of disaster and the loss from any disaster, and also helps evacuation of people from a disaster.

It is another object of the present invention to provide a method of determining request transmission priority subject to request source and transmitting request subject to such request transmission priority in application of Fieldbus communication framework, which uses different determination conditions, such as the numerical number of a counter or timer, the number of requests on queue, the switching of an external switch, the value detected by an external device, and etc. to enable the priority right of external requests which came from the source has the priority right, so that the user can set the triggering condition of a controlled device in a specific industry or technical field to satisfy different industrial control requirements.

It is still another object of the present invention to provide a method of determining request transmission priority subject to request source and transmitting request subject to such request transmission priority in application of Fieldbus communication framework, which categorizes the priority right into kinds or levels so that different external requests from different sources that a same priority level can be categorized into one same group. Thus, any external request that has the highest priority will not be arranged behind an external request that has a second-highest priority, and the user can obtain more right to control the communication gate and will not be constrained by the existing Fieldbus communication protocol.

DETAILED DESCRIPTION OF THE PREFERRED EMBODIMENT

From the aforesaid prior art technique, we know that Fieldbus is a master/slave communication protocol, and the master device or communication gateway under the Fieldbus architecture handles requests subject to the order of FIFO (first in first out). Therefore, all requests are sorting subject to their received times, Normally, in one same Fieldbus network, it is allowed that different slave devices connect to one communication gateway or master device. However, there are many different communication standards compatible to Fieldbus, including CAN, EtherCAT, DeviceNet, Modbus, PROFIBUS, SECS and CompuBus. These communication standards have the common characteristics of shared multi-transmission channel, multi-serial channel, bi-directional and multidrop characteristics. Under Fieldbus communication protocol, the method of determining request transmission priority subject to request source and transmitting request subject to such request transmission priority in application of Fieldbus communication framework, of the present invention is applicable to every of the aforesaid various communication standards that are compatible to Fieldbus communication protocol. The following description uses the term of Fieldbus to substitute for terms of CAN, EtherCAT, DeviceNet, Modbus, PROFIBUS, SECS and CompuBus. Further, the Fieldbus used in the present specification means the protocol applied to automatic control having a master/slave architecture, and a request, response or exception communication mode.

Figure 1:
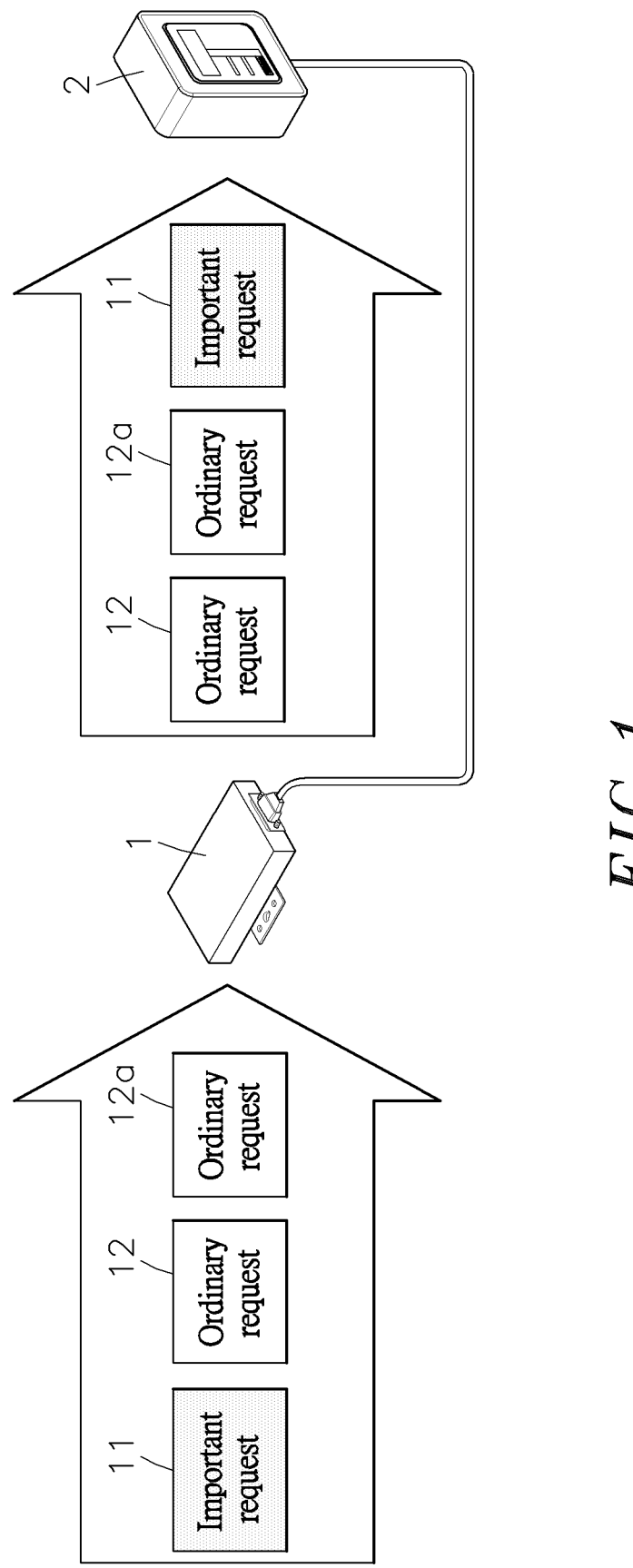
FIG. 1 is a schematic drawing illustrating a communication architecture according to the preferred embodiment of the present invention.

FIG. 1 is a schematic drawing illustrating a communication architecture according to the preferred embodiment of the present invention. As illustrated, when the communication gateway 1 has a slave device 2 connected thereto and when the communication gateway 1 receives from a remote control end multiple control requests (sorting to be an ordinary request 12a, an ordinary request 12, and an important request 11), the communication gateway 1 determines the priority of the instructions or requests subject to their sources, so that the slave device 2 can receive the important request 11 prior to the ordinary requests 12 and 12a.

Figure 2:
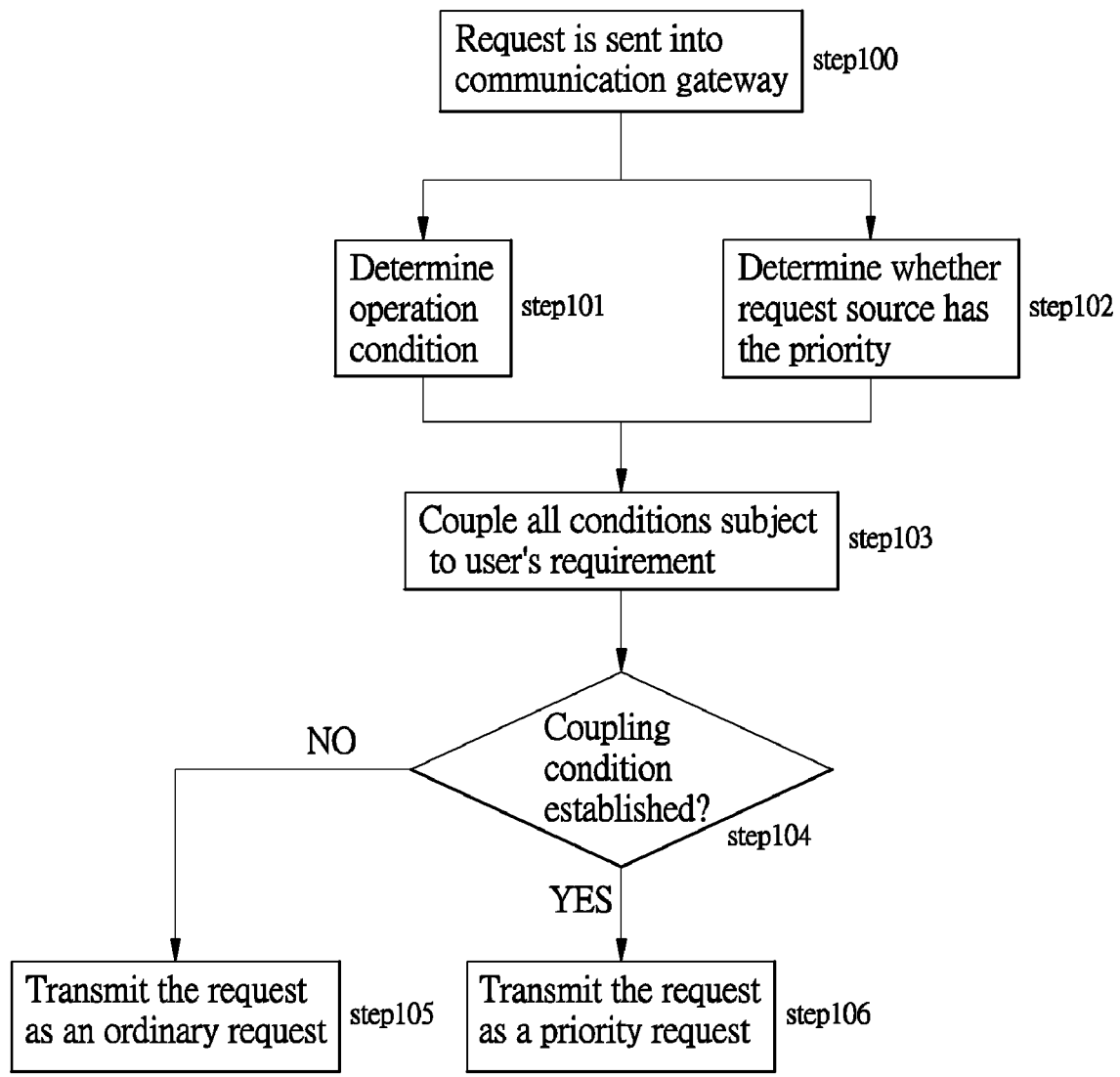
FIG. 2 is a priority determination flowchart according to the present invention.
Figure 3:
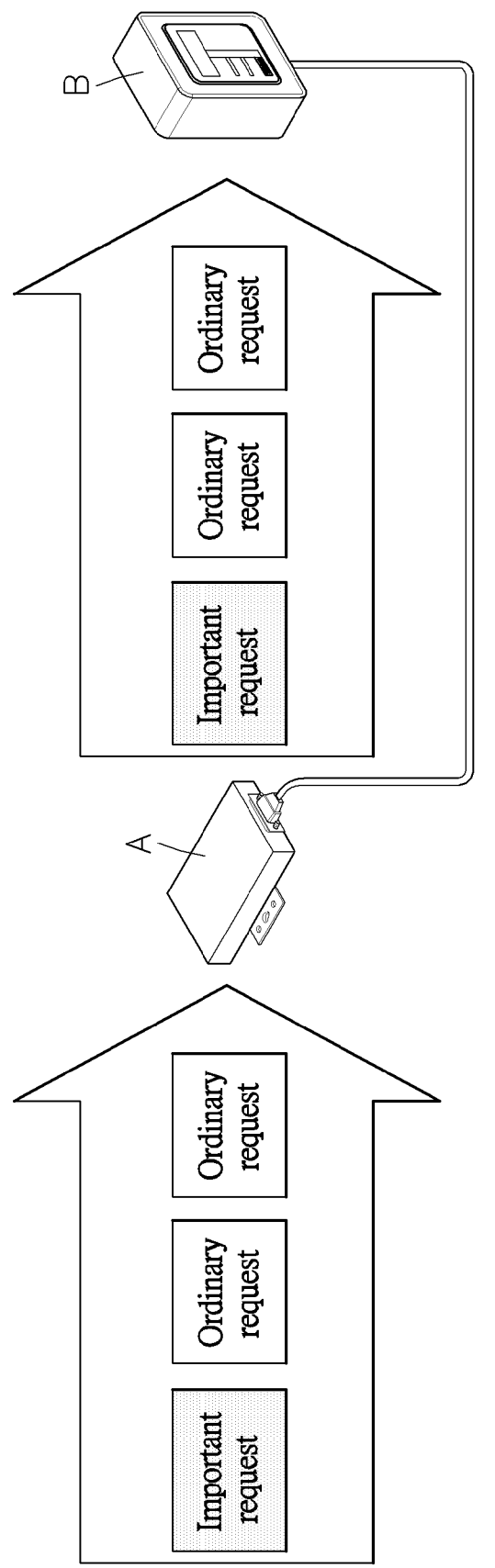
FIG. 3 is a schematic drawing illustrating multiple requests receiving status of a communication gateway according to the prior art.

Referring to FIG. 2 and FIG. 1 again, the determination of priority according to the present invention includes the steps of:
(100) When a request is transmitted to the communication gateway 1, run step (101) and (102);
(101) Determine the operation conditions are established or not, and then run step (103);
(102) Determine whether the source of each received request has the priority right, and then run step (103);
(103) Couple all conditions which includes conditions in step(101) and (102) subject to the user's requirement;
(104) Determine whether the coupling conditions are established or not, and then run step (106) when the coupling conditions are established, or run step (105) when the coupling conditions are not established;
(105) Transmit the request as an ordinary request, and end the procedure;
(106) Transmit the request as a priority request, and then end the procedure.

Briefly speaking, the invention uses two or more methods to determine or couple conditions of external requests and then see whether they are in satisfaction of the conditions required for priority. At first, in step (101), the operation conditions can be the numerical value of a counter or timer, the number of requests in queue, switching of external switch or any logical operation conditions detected by an external device (such as whether or not in proximity to a predetermined temperature or humidity). These conditions can be used in step (101) as judgment values for AND or OR on logic coupling. Further, in step (102), the source of a request can be a specific IP address or communication port (such as COM port, Serial Port). Therefore, based on the aforesaid determination conditions, the communication gateway 1 can determine whether the received external requests have the priority to transmit or not, and can proceed with transmission of requests early. When an external request is determined to be a priority request, the communication gateway 1 tags this priority request in the priority position on the original queue, or uses any other method that allows sending of a request in priority to transmit this priority request so as to obtain an earlier transmission time prior to ordinary requests 12 and 12a. Further, during step (100), if the format of the external request is not in conformity with the format under Fieldbus communication architecture or the format of the external request is compatible to Fieldbus communication architecture (for example, Ethernet), the request can be converted into a suitable format during step (105) or step (106) before transmission. Therefore, the external request can be transmitted at the format of its source or after a format conversion.

For easy understanding of different request sources, we make a brief description on IP address. At first, the so-called IP (Internet Protocol) is a communication protocol for transmission of digital signal through the Internet. An IP address (Internet Protocol address) is a unique address that devices use in order to identify and communicate with each other on a computer network utilizing the Internet Protocol standard. The format of an IP address is a 32-bit numeric address written as four numbers separated by periods. Each number can be zero to 255. For example, 140.113.23.3 could be an IP address. There are four regional Internet registries assign Internet addresses from three classes, i.e., Class A that supports hosts on each of 126 networks obtained by big-scale computer companies, Class B that supports hosts on each of 16382 networks given to International organizations or network companies, and Class C that supports hosts on each of 2097150 networks for ordinary companies or individuals. Further, a host or end-user on a local area network (intranet) can have its own IP address. By means of the application of IP addresses under this communication protocol, the communication gateway 1 can determine whether the source of each received external request has an IP addresses of a higher level of priority or is a communication port that has a higher level of priority, and can send the important request 11 to the slave device 2 early.

In actual practice, when too many external requests are received, the communication gateway 1 may be unable to sort the priority of the received external requests effectively. By means of the aforesaid method of using request source, the invention determines the priority of external requests. Therefore, the invention eliminates the problem of being unable to sort external requests when too many external requests are received. Further, the invention categorizes the priority right into kinds or levels so that different external requests from different sources that have a same priority level can be categorized into one same group. Thus, any external request that has the highest priority will not be arranged behind an external request that has a second-highest priority, and the user can obtain more right to control the communication gateway 1 and will not be constrained by the existing Fieldbus communication protocol.

The method of determining request transmission priority subject to request source and transmitting request subject to such request transmission priority in application of Fieldbus communication framework as described above is simply an example of application of the present invention. In actual practice, the invention could be implemented on a master device, or a communication device or repeater which is capable to receive external requests from different sources. Further, the operation condition to be coupled subject to the user's requirement can be the numerical value of a counter or timer, the number of requests on queue, switching of an external switch, or the value detected by an external device (for example, specific temperature or humidity).

Further, the type of the external requests used described above can be READ, WRITE, REPLACE, DETECT, etc.

Further, the request source can be an IP address or Fieldbus serial port. Therefore, all different communication devices capable of receiving external requests, external requests from different sources, and different priority determination conditions shall be included into the invention.

When compared to the prior art technology, the invention has the following advantages:

1. In regular building automation applications, proximal/remote or master/slave concept is adopted. All events management and emergency handling are connected to a computer in the main control room through a transmission interface. When a condition happens, a person in the main control room or the computer issues a request to an external input/output device to execute a specific action, for example, turning on the radiation fan when the temperature is excessively high, turning on the alarm lamp when the exit door is abnormally opened, starting the automatic sprinkling system when the temperature surpasses a predetermined fire temperature, etc. Because the triggering time of these actions is critical, the communication gateway 1 that is in charge of transferring the request must transmits the request in priority. If the communication gateway I cannot handle the priority request from a specific source (main control end) on time due to reception of a big number of other unimportant requests, the main control end or manager may be unable to start the related emergency facility at the accurate time point. Therefore, by means of determining the priority of each received request subject to its source, the invention prevents the communication gateway I from sending out an important request 11 at a late time, enabling the important request 11 to trigger the related facility at the accurate time point, and therefore the invention can lower the chance of disaster and the loss from a disaster, and can also help evacuation of people from a disaster. Therefore, the invention eliminates the problem of being unable to transmit an important request on time as encountered in the prior art technology, which handles all external requests subject to the order of first-in first-out.

2. According to the existing communication protocols under Fieldbus architecture, it is to handle external requests subject to the order of first-in first-out. This request transmission order does not allow transmission of an important request in priority, and may result a system failure. In an industrial manufacturing line (for example, a wafer plant or plastic materials plant), if the communication gateway 1 cannot transmit a control request to the slave device 2 or the slave device 2 cannot execute the request from the communication gateway 1 at the accurate time point, the manufacturing line may be interrupted or an abnormal condition may occur in the manufacturing line, thereby resulting in paralysis or damage of the machinery of the industrial manufacturing line. Therefore, by means of determining the priority of each received external request subject to its source, the communication gateway 1 can transmit every important request to the slave device or operating end on time, preventing a delay of trigging time.

3. By means of different determination conditions, such as the numerical number of a counter or timer, the number of requests on queue, the switching of an external switch, the value detected by an external device, and etc. to match with the priority of each received external request subject to its source, the user can set the triggering condition of a controlled device in a specific industry or technical field to satisfy different industrial control requirements, i.e., the user can satisfy different industrial control requirements subject to different situations.

4. Following alternation of generations, Fieldbus communication architecture has become a communication standard in industrial field, and devices in conformity with Fieldbus architecture are intensively used to connect different industrial electronic devices. An industrial application of the method of determining request transmission priority subject to request source and transmitting request subject to such request transmission priority in application of Fieldbus communication framework does not need to add extra physical devices or elements. When matching with the widely applied Fieldbus architecture, the invention can achieve determination of priority right after installation or setting of a software. Therefore, the application of the invention eliminates installation cost of any physical device.

5. The invention uses requests under Fieldbus protocol standards directly, and needs not to define other special requests or to change its architecture. Therefore, any request used does not affect normal functioning of the slave device. Further, either using the Fieldbus master device or Fieldbus communication gateway to transmit external requests, the priority right of every request can be determined through a software. Therefore, the user needs not to worry about the system operational problem that the control end cannot receive the request from the communication gateway on time and that may affect the client's confidence in the reliability of the product, causing the client to reject the product.

6. By means of categorizing priority right into kinds or levels, all external requests from different sources have a same priority level can be categorized into one same class. Thus, any external request that has the highest priority will not be arranged behind an external request that has a second-highest priority, and the user can obtain more right to control the communication gateway and will not be constrained by the existing Fieldbus communication protocol.

Although a particular embodiment of the invention has been described in detail for purposes of illustration, various modifications and enhancements may be made without departing from the spirit and scope of the invention.

What the invention claimed is:

1. A method of determining request transmission priority subject to request source and transmitting request subject to such request transmission priority in application of Fieldbus communication framework, comprising the steps of:
   (a) obtaining a user setting;
   (b) transmitting a plurality of external requests from a remote control end to a communication device one after another, and the communication device receiving the external requests;
   (c) the communication device determining whether the source of each received external request has a priority right;
   (d) the communication device determining whether there is at least one logical operation condition established;
   (e) the communication device coupling the logical operation conditions subject to the user setting and the priority right of the source of each received external request to determine whether each received external request has a priority to transmit;
   (f) the communication device transmitting to a slave device each of said received external requests that does not have the priority to transmit as an ordinary request; and
   (g) the communication device transmitting to a slave device each of said received external requests that has the priority to transmit as a priority request;
   wherein the logical operation condition is coupled subject to an on/off switch function settable by a user.

2. The method as claimed in claim 1, wherein the priority request transmission procedure is to send the external request into the communication device into a queue having a higher priority.

3. The method as claimed in claim 1, wherein the priority request transmission procedure is to tag the priority request in the priority position on an original queue.

4. The method as claimed in claim 1, wherein said communication device categorizes the priority right into different levels or kinds 5. The method as claimed in claim 1, wherein the logical operation condition to be coupled subject to the user's setting is the numerical value of a counter/timer.

6. The method as claimed in claim 1, wherein the logical operation condition to be coupled subject to the user's setting is the number of requests on a queue.

7. The method as claimed in claim 1, wherein said communication device is one of the electronic devices including communication gateway, master device, and repeater or device that are capable of receiving different external requests.

8. The method as claimed in claim 1, wherein when the external requests that are transmitted from said remote control end to said communication device are not in conformity with Fieldbus communication framework format, the external requests are processed through a format conversion procedure before sending out by said communication device.

9. The method as claimed in claim 1, wherein the Fieldbus communication framework is one of the framework of CAN, EtherCAT, DeviceNet, Modbus, PROFIBUS, CompuBus and SECS protocols for automated control application that has a master/slave architecture and communication mode of Request, Response or Exception.

10. The method as claimed in claim 1, wherein the request source is one of an IP address and a Fieldbus serial port.

* * * * *